United States Patent [19]

Kimball

[11] 4,192,190
[45] Mar. 11, 1980

[54] UNIDIRECTIONAL BEARING STRUCTURE HAVING TEMPERATURE CYCLING TOLERANCE

[75] Inventor: David V. Kimball, Claremont, Calif.

[73] Assignee: Kimball Industries, Inc., Monrovia, Calif.

[21] Appl. No.: 956,184

[22] Filed: Oct. 31, 1978

[51] Int. Cl.² .............................................. G01M 7/00
[52] U.S. Cl. ............................................ 73/665; 308/9
[58] Field of Search ................. 73/665, 663; 308/5 R, 308/3 A, 3 R, 9

[56] References Cited

U.S. PATENT DOCUMENTS

| 3,011,354 | 12/1961 | Ireton et al. | 73/665 |
|---|---|---|---|
| 3,142,172 | 7/1964 | Taccogna | 73/665 |
| 3,164,984 | 1/1965 | Gertel | 73/665 |
| 3,208,270 | 9/1965 | Hill | 73/665 |
| 3,933,033 | 1/1976 | Kimball | 73/665 |
| 4,092,869 | 6/1978 | Kimball | 73/665 |

*Primary Examiner*—Donald O. Woodiel
*Attorney, Agent, or Firm*—Louis J. Bachand

[57] ABSTRACT

Hydrostatic bearing apparatus adapted to mount a shaker-coupled, dimensionally temperature dependent test piece for vibratory oscillation along a predetermined test axis. The apparatus comprises a support block having a compliant section defining a bore, a shaft axially journaled in the bore and defining therewith a bearing locus paraxial with the test axis. Bracket means is provided securing the test piece to the shaft beyond the locus for bearing-guided test axis oscillation, the bearing locus being test axis paraxially bodily displaceable responsive to displacement of the compliant section in test piece dimensional change accommodating relation.

23 Claims, 7 Drawing Figures

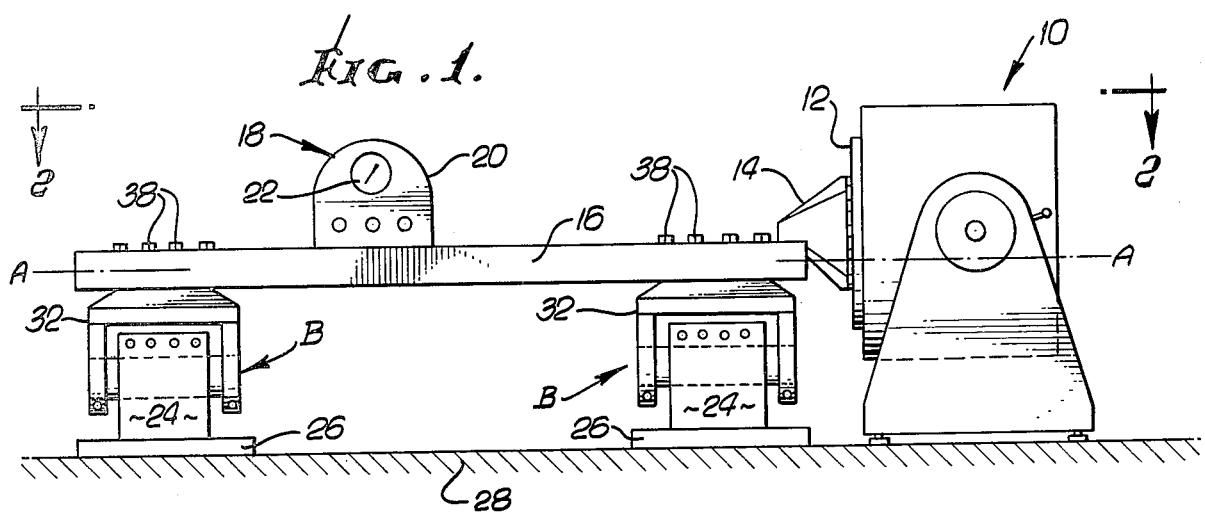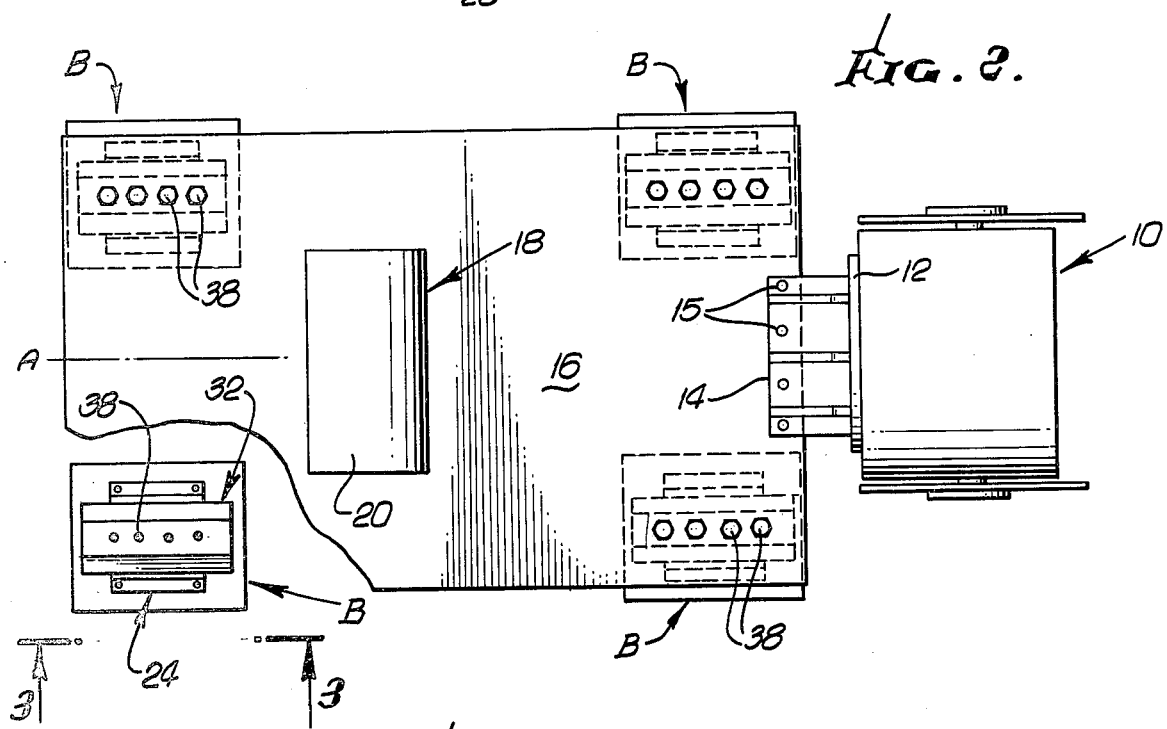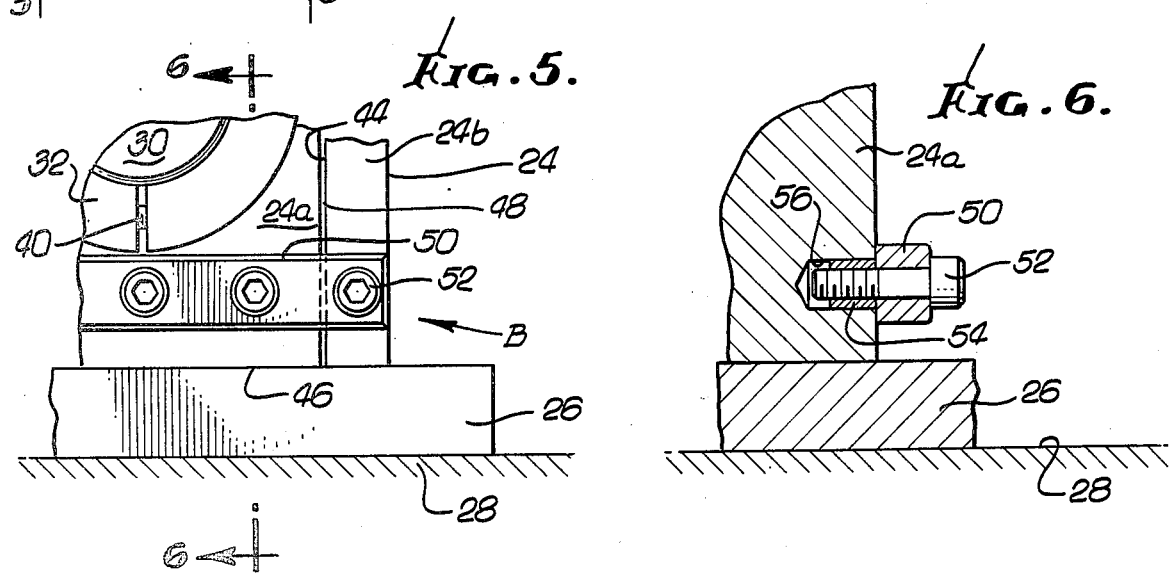

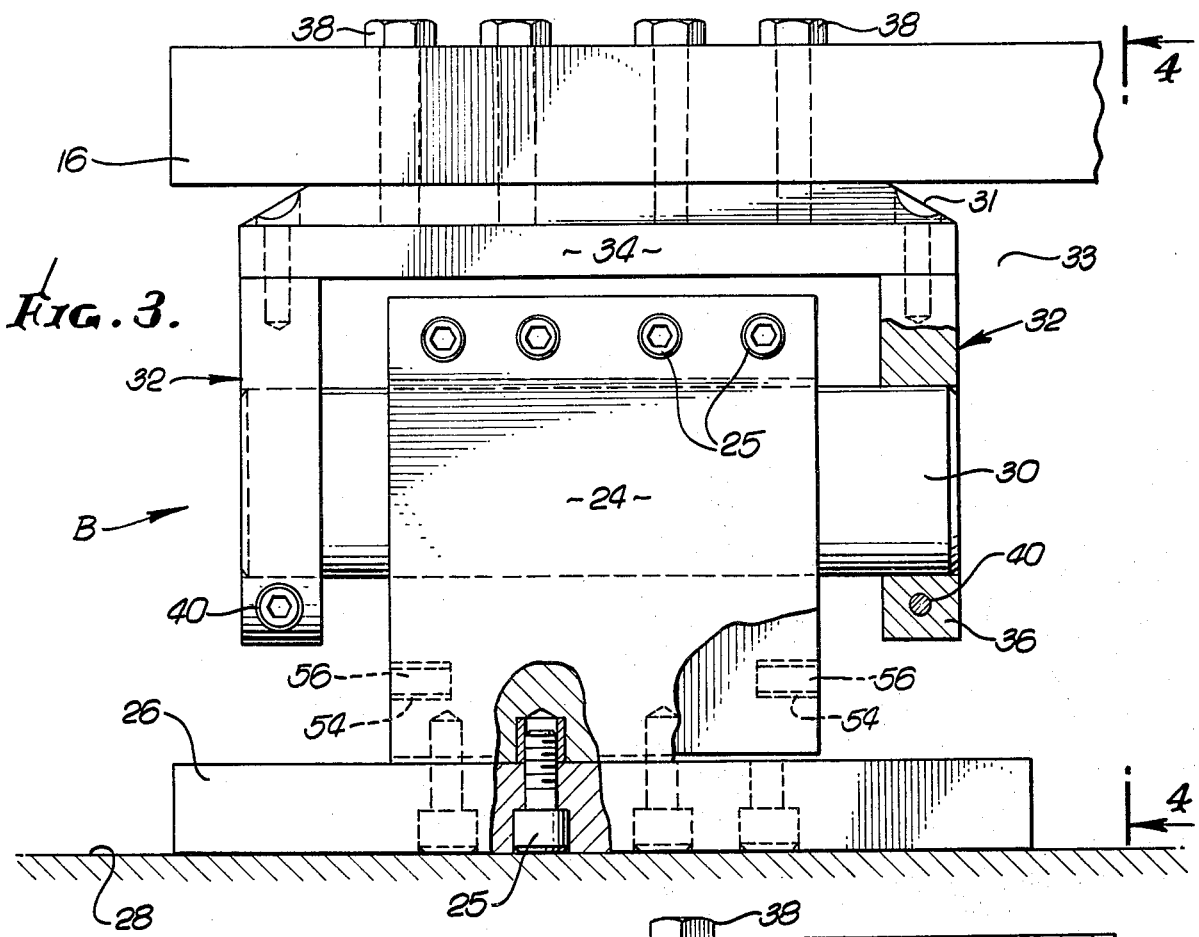
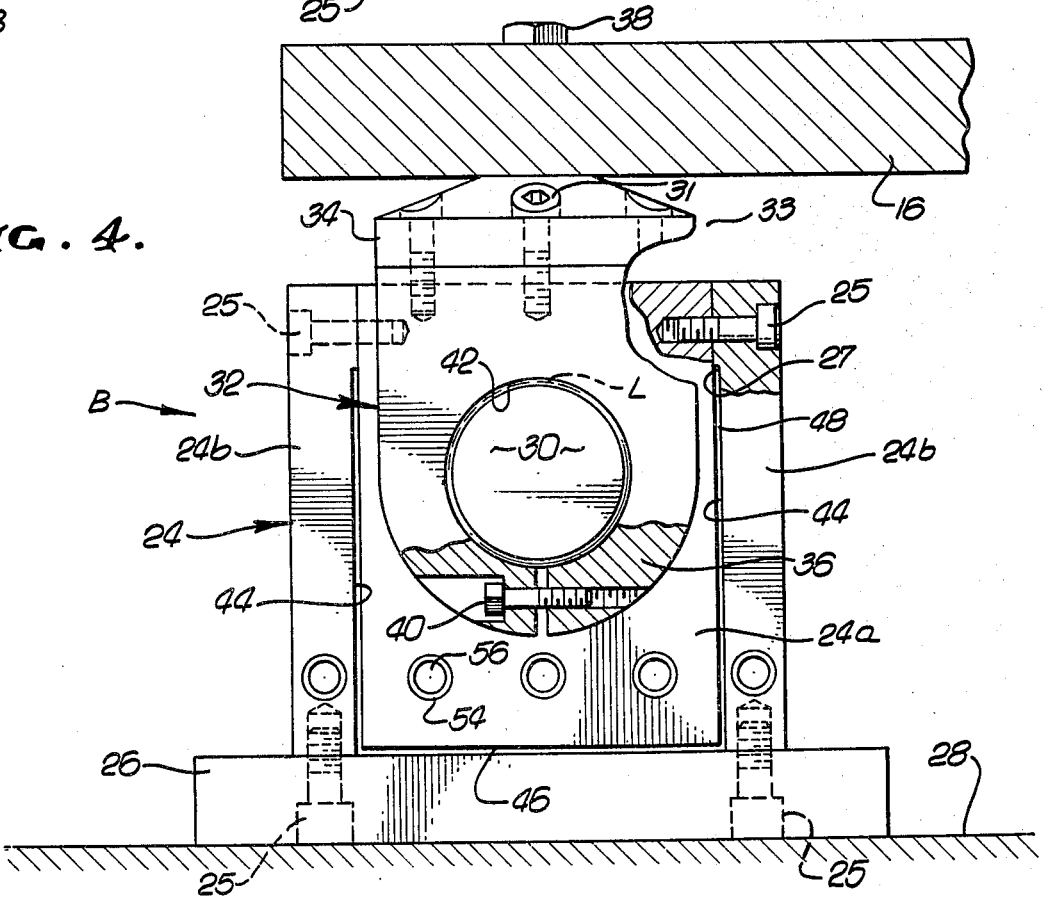

UNIDIRECTIONAL BEARING STRUCTURE HAVING TEMPERATURE CYCLING TOLERANCE

BACKGROUND OF THE INVENTION

This invention has to do with vibration test apparatus and more particularly is concerned with a hydrostatic bearing apparatus useful in vibration testing. In particular the apparatus provides a bearing for test piece oscillation which accommodates temperature induced dimensional changes in the test piece.

The use environment of many electronic and mechanical components requires evaluation of the component for vibration stability. Typically the component or piece to be tested is mounted for vibrational movement in a single axis at a predetermined rate, induced by a shaker-head coupled to the test piece per se or to a jig supporting the test piece. The test piece is supported on a slip plate and the slip plate in turn is supported on a bearing table which insures the necessary axially directional movement. Because test criteria require faithful replication of the test protocol, the need to have freedom from extraneous sideways movement, or other than test axis movement, is paramount.

Certain test pieces are so large that they are not conveniently carried upon conventional bearing structures. And for these test pieces special bearing devices must be used. Other test pieces are sufficiently large that the ordinarily experienced changes in temperature in the test environment cause conventional bearing structures to bind, and thereby induce extraneous axes of movement into the test procedure, skewing results, and making the test unreliable.

It is accordingly a major object of the present invention to provide a novel hydrostatic bearing apparatus which is responsive to dimensional changes in the test piece, induced by temperature changes, but which, withal, maintains a uniaxial test direction.

This and other objects of the invention, to become apparent hereinafter, are realized by a novel hydrostatic bearing apparatus in which the bearing locus is bodily displaceable responsive to dimensional changes in the test piece, whereby binding and extraneous non-test axis movement is avoided and true test results obtained.

More particularly, the invention provides a hydrostatic bearing apparatus adapted to mount a shaker-coupled dimensionally temperature dependent test piece for vibratory oscillation along a predetermined axis in which the apparatus comprises a support block having a compliant section defining a bore, a shaft axially journaled in the bore and defining therewith a bearing locus paraxial with the test axis, and bracket means securing the test axis to the shaft beyond the locus for bearing-guided test axis oscillation, the bearing locus being test axis paraxially bodily displaceable responsive to displacement of the compliant section in test piece dimensional change accommodating relation.

Typically, the support block centrally supports the shaft and the bracket means is secured to the shaft ends on either side of the support block. The bracket means typically comprises a saddle having depending ears defining securing means for securing the saddle rigidly to the shaft, and a base portion between the ears adapted to be rigidly fastened to the test piece.

In particular embodiments the test piece may comprise a slip plate driven by a shaker and an assembly to be vibration tested fixed to the slip plate, or the test piece may be comprise an assembly to be vibration tested coupled directly between the shaker and the bracket means. In either instance the apparatus of course may include a shaker coupled to the test piece in vibration transmitting relation.

In more particularly preferred embodiments, for use in a hydrostatic bearing apparatus adapted to mount a shaker-coupled dimensionally temperature dependent test piece for vibratory oscillation along a predetermined test axis, having a shaft, and a bracket coupling the test piece to the shaft; there is provided a shaft support block having a compliant section with a through bore for axially journaling the shaft and defining a bearing locus therewith paraxially with the test axis, the bearing locus being test axis paraxial bodily displaceable responsive to displacement of the compliant section in test piece dimensional change accommodating relation. The support block may include means selectively restraining compliant section displacement, and comprise the compliant section, support walls supporting the compliant section and means defining a section displacement clearance between the walls and the section locally laterally opposite the bore. The mentioned support walls may be separably secured to the compliant section in laterally spaced relation therefrom to define the displacement clearance. The securement of the walls to the section generally is above the section bore, and the apparatus further includes means selectively securable to both the walls and the section below the bore to block section displacement.

Accordingly, in one preferred embodiment there is provided hydrostatic bearing apparatus adapted to mount a shaker-coupled dimensionally temperature dependent test piece for vibratory oscillation along a predetermined test axis comprising a support block having a displaceable compliant section defining a bore and means defining a section displacement clearance locally laterally opposite the section bore, a shaft axially journaled in the section bore and defining therewith a bearing locus paraxial with the test axis, and bracket means securing the test piece to the shaft beyond the locus for bearing-guided test axis oscillation, the bearing locus being subject to shaft-transmitted sideways thrust upon temperature change induced dimensional changes in the test piece, the compliant section bearing locus being test axis paraxially bodily displaceable through displacement of the compliant section into the clearance, responsive to sideways thrusting of the shaft in test piece dimensional change accommodating relation.

In such embodiments there is further provided apparatus in which the support block centrally supports the shaft and the bracket is secured to the shaft on either side of the support block, the bracket means comprising a saddle having depending ears having clamping means for clamping the saddle rigidly to the shaft, and a base portion between the ears adapted to be rigidly fastened to the test piece; the test piece includes means for coupling the test piece to a shaker in vibration transmitting relation, whether the test piece comprises a slip plate drivingly coupled to the shaker and an assembly to be vibration tested fixed to the slip plate or whether the test piece comprises an assembly to be vibration tested in directly coupled relation between the shaker and the bracket means.

As in earlier embodiments the support block may include means selectively restraining compliant section displacement and in such embodiments the support block will comprise a compliant section, support walls supporting the compliant section in depending relation and walls defining a section displacement clearance between the walls and the section locally laterally opposite the bore, the support walls being separably secured to the compliant section in laterally spaced relation therefrom to define the displacement clearance, the support wall securement to the section being above the section bore, and there being further included means selectively securable to both said walls and section below the bore to block section displacement.

In a highly preferred embodiment of the invention there is provided hydrostatic bearing apparatus adapted to mount a shaker-coupled, dimensionally temperature dependent test piece for vibratory oscillation along a predetermined test axis, the apparatus comprising a support block having support walls and depending therefrom a displaceable compliant section defining a bore, the walls and section being locally laterally spaced opposite the bore to define a section displacement clearance, a shaft reciprocally axially journaled in the section bore in centrally supported relation and defining with the bore a bearing locus paraxial with the test axis, and bracket means securing the test piece to the shaft at opposite ends thereof beyond the support block section bore, such bracket means each comprising a saddle having depending ears defining split ring clamps circumferentially clamping the saddle to the shaft, and a base portion between the ears for rigidly fastening the bracket to the test piece, for bearing-guided test axis oscillation, the bearing locus being subject to shaft-transmitted sideways thrust upon temperature change induced dimensional changes in the test piece, the compliant section bearing locus being test axis paraxially bodily displaceable upon and to the extent of displacement of the compliant section into the clearance responsive to sideways thrusting of the shaft in test piece dimensional change accommodating relation.

In each of the foregoing embodiments there may further be included also a shaker coupled to the test piece in vibration transmitting relation.

BRIEF DESCRIPTION OF THE DRAWINGS

The invention will be further described as to an illustrative embodiment thereof in conjunction with the attached drawings in which:

FIG. 1 is a side elevational view of a test setup illustrating the use condition of the hydrostatic bearing apparatus of the invention secured to a test piece;

FIG. 2 is a plan view thereof partly broken away to show the hydrostatic bearing apparatus of the invention;

FIG. 3 is a side elevational view partly broken away to show underlying parts and taken on Line 3—3 in FIG. 2.

FIG. 4 is an end elevation view of the present apparatus partly broken away to show underlying detail and taken on Line 4—4 in FIG. 3;

FIG. 5 is a fragmentary view taken in the plane of FIG. 4 and showing a modified form of the invention;

FIG. 6 is a fragmentary view greatly enlarged taken on line 66 in FIG. 5; and

DESCRIPTION OF THE PREFERRED EMBODIMENTS

Figure 7:
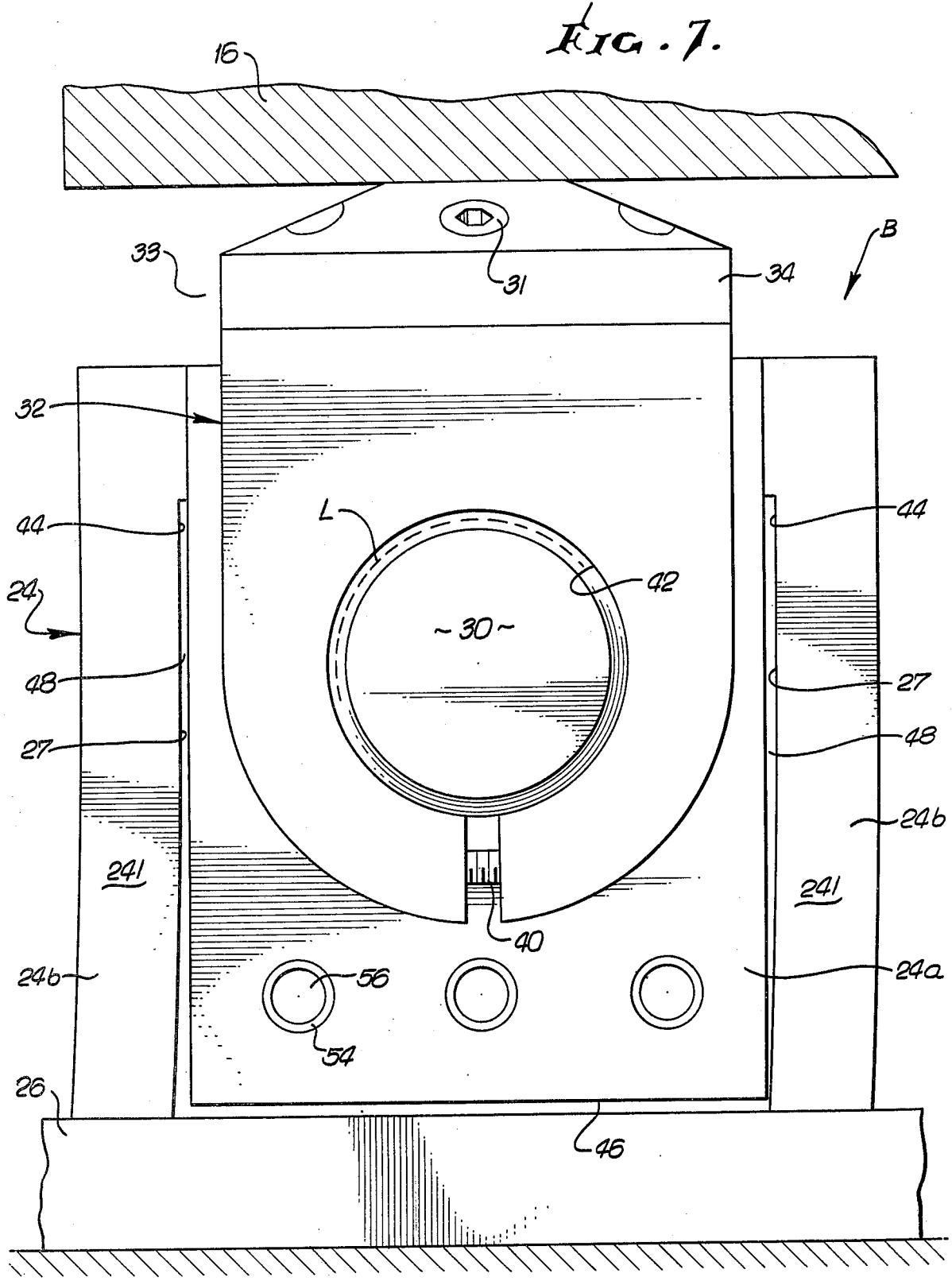
FIG. 7 is a view like FIG. 4 greatly enlarged and somewhat exaggerated showing the body displacement of the compliant section and the bearing locus therewith in the dimensional change accommodating condition of the apparatus.

It will be noted from the foregoing summary descriptions of the apparatus, that the binding at the bearing locus, caused heretofore by the lateral displacement of the oscillating shaft relative to the bearing structure surrounding the shaft, has been overcome by having the shaft and the surrounding bearing structure move together, i.e. the bearing locus moves as a unit, and responsive to test piece dimensional change induced displacement; but the vital, uniaxial guide function of the bearing locus is retained, indeed enhanced because of the absence of binding and its concomitant scattering of the oscillation axes.

Turning now to the drawings in detail, in FIGS. 1 and 2 a typical test set up in accordance with the invention is shown including a shaker 10, having a shaker head 12 coupled to a driver 14 which in turn is coupled by pins 15 to a slip plate 16. These elements are rigidly interconnected to oscillate the slip plate 16 at a predetermined frequency and only in one axis, the longitudinal axis A of the plate.

Test piece 18 comprises a support 20 bolted or otherwise rigidly secured to the slip plate 16 and carrying a component 22 to be tested, oriented as desired for a particular test.

It is well to note here that the slip plate 16 may be dispensed with where the test component is so large as to be securable directly to the shaker head 12 and directly supported by on or more of the bearing apparatus now to be described.

With reference to FIGS. 1-4 it will be seen that the slip plate 16, test component support 20 and test component 22, together constituting the test piece in this illustration, are carried at each of the four corners by a bearing apparatus B. Bearing apparatus B, shown in enlarged detail in FIGS. 3 and 4, comprises a support block 24 bolted by bolts 25 to pedestal 26 which is resting on mass 28 which may be the earth. A shaft 30 is journaled in block 24 for oscillatory movement. Bracket 32, comprising saddle 33 having a base portion 34 from which depend laterally spaced bolt-on ears 36 is secured by its base portion to the slip plate 16 by means of bolts 38. Ears 36 are of the split ring type typically fastenable to the shaft 30 at opposite sides of the support block 24 by adjustment of bolt 40. Upon assembly, the slip plate 16 and test piece 18 oscillate left to right in the drawing supported by bearing locus L defined between shaft 30 and the bearing structure bore 42 defined by block 24.

Thusfar described, the apparatus is largely conventional.

Difficulties with known bearing assemblies arise when the test piece, be it the slip plate 16 and test component 22 or the test component itself, rigidly fastened to the bracket base portion 34, changes dimension. The larger the test piece 18, the greater the ambient temperature variations and the greater the temperature coefficient of the test piece, the more likely is non coordinated relative displacement of the bearing structure bore 42 and the shaft 30 and resultant binding from the lateral or sideways thrusting of the shaft 30 against the sidewall of the block bearing structure bore 42, altering the desired perfection of axial oscillation and unpredictably changing test conditions. Obviously these massive, critically alined bearing structures can not be adjusted back and forth on their pedestals, or the pedestals on the ground, if test protocol accuracy is to be maintained and expense is to be kept within reasonable bounds for every encountered variation in ambient temperature conditions.

Accordingly, and to solve this dilemma, the present invention provides a bearing locus L which is displaceable, commensurate with, and responsive to, dimensional changes in in the test piece, induced by ambient temperature variations, and redisplaceable to its original alinement when operating conditions return to original values.

This self-adjusting and self-readjusting apparatus is shown most clearly in FIG. 4. There it will be seen, and in contradistinction to previously known support blocks, the support block 24 is provided with left and right hand kerfs 44 parallel to the oscillation axis A and extending above and below the bearing locus L, dividing the block into a center section 24a and two support wall defining outboard sections 24b from which the center section is spaced in compliant relation. The kerf 44 vertical extension below the locus L may be less than shown, i.e. extension to the lower wall 46 of the support block 24 is not necessary, but such extension is a fabricating convenience. A single block 24 may be sawn to form the kerfs 44, but it is preferred to bolt the outboard sections 24b to the center section 24a with bolts 24b as shown. The outboard sections being relieved at 27 to provide the requisite displacement clearance or lateral width space indicated by numeral 48.

What is required in dimensioning the lateral width of the kerf 44 is that it defines a clearance which accommodates the desired degree of displacement of the bearing locus L, as will now be described.

Recalling that relative sideways movement of the shaft 30 to the bearing structure bore 42 is normally resultant from temperature induced dimensional changes in the test piece—it is the function of the present apparatus to permit such sideways thrusting to be accommodated while maintaining the true axial motion of the shaft, by keeping the bearing locus L accurately alined despite displacement.

This is accomplished by the block 24 section 24a which defines the bearing structure bore 42 being compliant, i.e. responsively displaceable by test piece dimensioned change. That is the section 24a central portion, because of the kers 44 on either side, is able to be displaced with and to the extent necessary to accommodate the dimensional change sideways thrust of the test piece 18 shifting bearing structure bore 42 relative to shaft 30, and without binding of the shaft on the bearing structure. This nonbinding accommodation is realized by keeping the shaft 30 centered within bearing structure bore 42, thus the entire locus L shifts, shaft 30 and structure bore 42 together. This effect is illustrated in an exaggerated way in FIG. 7. The distension of the block section 24b at 241 into the accommodation or displacement space 48 defined by kerf enables the locus L to move laterally correspondingly. Upon release of the sideways thrusting stress, the distension at 241 reduces and the compliant section 24a moves back to its original position, relative to outboard sections 24b.

It is especially important to note that the mode of movement of the compliant section 24a by bodily displacement thereof enables secure mounting of the test piece generally, and localized specific and responsive accommodation of dimensional changes, as well.

When the apparatus is not to be dimensional change accommodating, a keeper means in the form of a bar 50 is bolted to the compliant section 24a and to the outboard block members 24b across the kerf 44 defined displacement clearance 48 by bolts 52 tapped into bushings 54 in holes 56, causing the block 24 to act as a monolithic element by restraining the displacement of compliant section 24a relative to outboard sections 24b as shown in FIGS. 5 and 6.

I claim:

1. Hydrostatic bearing apparatus adapted to mount a shaker-coupled, dimensionally temperature dependent test piece for vibratory oscillation along a predetermined test axis, said apparatus comprising a support block having a compliant section defining a bore, a shaft axially journaled in said bore and defining therewith a bearing locus paraxial with said test axis, and bracket means securing said test piece to said shaft beyond said locus for bearing guided test axis oscillation, said bearing locus being test axis paraxially bodily displaceable responsive to displacement of said compliant section in test piece dimensional change accommodating relation.

2. Hydrostatic bearing apparatus according to claim 1 in which said support block centrally supports said shaft, and said bracket means is secured to the shaft ends on either side of said support block.

3. Hydrostatic bearing apparatus according to claim 1 in which said bracket means comprises a saddle having depending ears defining securing means for securing said saddle rigidly to said shaft, and a base portion between said ears adapted to be rigidly fastened to said test piece.

4. Hydrostatic bearing apparatus according to claim 1, including also a shaker coupled to said test piece in vibration transmitting relation.

5. Hydrostatic bearing apparatus according to claim 1 in which said test piece comprises a slip plate driven by said shaker, and an assembly to be vibration tested fixed to said to slip plate.

6. Hydrostatic bearing apparatus according to claim 1 in which said test piece comprises an assembly to be vibration tested coupled directly between said shaker and said bracket means.

7. For use in a hydrostatic bearing apparatus adapted to mount a shaker-coupled, dimensionally temperature dependent test piece for a vibratory oscillation along a predetermined test axis and having a shaft, and a bracket coupling said test piece to said shaft: a shaft support block having a compliant section with a through bore for axially journalling said shaft and defining a bearing locus therewith paraxial with said test axis, said bearing locus being test axis paraxially bodily displaceable responsive to displacement of said compliant section in test piece dimensional change accommodating relation.

8. Apparatus according to claim 7 in which said support block includes means selectively restraining compliant section displacement.

9. Apparatus according to claim 7 in which said support block comprises said compliant section, support walls supporting said compliant section, and means defining a section displacement clearance between said walls and said section locally laterally opposite said bore.

10. Apparatus according to claim 9 in which said support walls are separably secured to said compliant section in laterally spaced relation therefrom to define said displacement clearance.

11. Apparatus according to claim 10 in which said wall securement to said section is above said section bore, and including also means selectively securable to both said walls and section below said bore to block section displacement.

12. Hydrostatic bearing apparatus adapted to mount a shaker-coupled, dimensionally temperature dependent test piece for vibratory oscillation along a predetermined test axis, said apparatus comprising a support block having a displaceable compliant section defining a bore, and means defining a section displacement clearance locally laterally opposite said section bore, a shaft axially journalled in said section bore and defining therewith a bearing locus paraxial with said test axis, and bracket means securing said test piece to said shaft beyond said locus for bearing-guided test axis oscillation, said bearing locus being subject to shaft-transmitted sideways thrust upon temperature change induced dimensional changes in said test piece, said compliant section bearing locus being test axis paraxially bodily displaceable through displacement of said compliant section into said clearance responsive to sideways thrusting of said shaft in test piece dimensional change accommodating relation.

13. Apparatus according to claim 12 in which said support block centrally supports said shaft, and said bracket is secured to the shaft on either side of said support block.

14. Apparatus according to claim 13 in which said bracket means comprises a saddle having depending ears defining clamping means for clamping said saddle rigidly to said shaft, and a base portion between said ears adapted to be rigidly fastened to said test piece.

15. Apparatus according to claim 14 including also test piece means for coupling said test piece to a shaker in vibration transmitting relation.

16. Apparatus according to claim 15 in which said test piece comprises a slip plate drivingly coupled to said shaker, and an assembly to be vibration tested fixed to said slip plate.

17. Apparatus according to claim 15 in which said test piece comprises an assembly to be vibration tested in directly coupled relation between said shaker and said bracket means.

18. Apparatus according to claim 15 in which said support block includes means selectively restraining compliant section displacement.

19. Apparatus according to claim 18 in which said support block comprises a compliant section, support walls supporting said compliant section in depending relation, and means defining a section displacement clearance between said walls and said section locally laterally opposite said bore.

20. Apparatus according to claim 19 in which support walls are separably secured to said compliant section in laterally spaced relation therefrom to define said displacement clearance.

21. Apparatus according to claim 20 in which said support wall securement to said section is above said section bore, and including also means selectively securable to both said walls and section below said bore to block section displacement.

22. Hydrostatic bearing apparatus adapted to mount a shaker-coupled, dimensionally temperature dependent test piece for vibratory oscillation along a predetermined test axis, said apparatus comprising a support block having support walls and depending therefrom a displaceable compliant section defining a bore, said walls and section being locally laterally spaced opposite said bore to define a section displacement clearance, a shaft reciprocally axially journaled in said section bore in centrally supported relation and defining with said bore a bearing locus paraxial with said test axis, and bracket means securing said test piece to said shaft at opposite ends thereof beyond said support block section bore, said bracket means each comprising a saddle having depending ears defining split ring clamps circumferentially clamping said saddle to said shaft, and a base portion between said ears for rigidly fastening said bracket to said test piece, for bearing-guided test axis oscillation, said bearing locus being subject to shaft-transmitted sideways thrust upon temperature change induced dimensional changes in said test piece, said compliant section bearing locus being test axis paraxially bodily displaceable upon and to the extent of displacement of said compliant section into said clearance responsive to sideways thrusting of said shaft in test piece dimensional change accommodating relation.

23. Apparatus according to claim 22 including also a shaker coupled to said test piece in vibration transmitting relation.

* * * * *